J. P. LAVIGNE.
UNIVERSAL JOINT.
APPLICATION FILED JAN. 22, 1917. RENEWED MAR. 10, 1919.
1,319,295.  Patented Oct. 21, 1919.
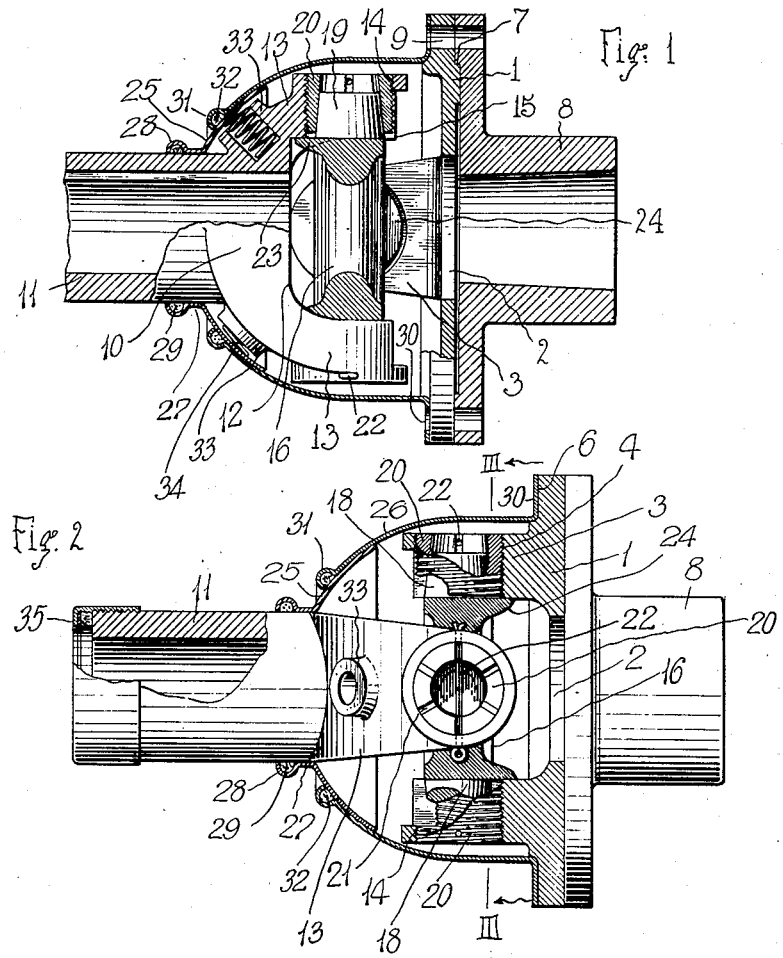
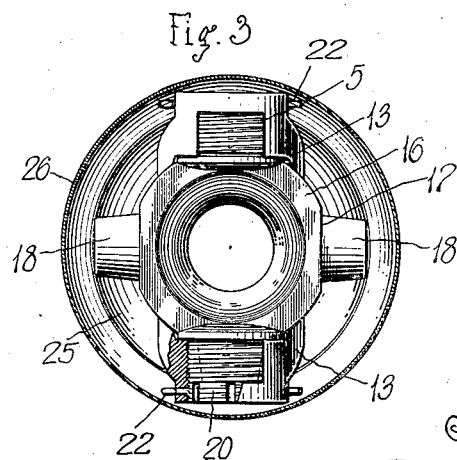
Inventor
Joseph P. Lavigne
Witnesses

UNITED STATES PATENT OFFICE.

JOSEPH P. LAVIGNE, OF DETROIT, MICHIGAN, ASSIGNOR TO DETROIT MECHANICAL ENGINEERING COMPANY, OF DETROIT, MICHIGAN, A CORPORATION OF MICHIGAN.

UNIVERSAL JOINT.

1,319,295.         Specification of Letters Patent.       Patented Oct. 21, 1919.

Application filed January 22, 1917, Serial No. 143,765. Renewed March 10, 1919. Serial No. 281,817.

*To all whom it may concern:*

Be it known that I, JOSEPH P. LAVIGNE, a citizen of the United States of America, residing at Detroit, in the county of Wayne and State of Michigan, have invented certain new and useful Improvements in Universal Joints, of which the following is a specification, reference being had therein to the accompanying drawings.

This invention relates to universal joints, and more particularly to that type embodying a drive member, a driven member, and a trunnion member universally connecting the drive and driven members.

The primary object of my invention is to provide a universal joint of the above type wherein simple and effective means are employed, in a manner hereinafter set forth, for expeditiously assembling a trunnion member relative to drive and driven members.

Another object of my invention is to furnish a universal joint of the above type with a novel dust guard and lubricant shield, the guard consisting of inner and outer members disposed to permit of the drive member of the joint shifting relative to the driven member, without any danger of dust, dirt, or other foreign matter entering parts of the joint.

A further object of my invention is to provide a universal joint possessing all the prerequisites of a good joint and with this end in view, my invention resides in the construction to be hereinafter described and then claimed.

Reference will now be had to the drawing, wherein—

Figure 1 is a vertical longitudinal sectional view of the universal joint with parts thereof in elevation;

Fig. 2 is a horizontal longitudinal sectional view of the same, partly in elevation, and Fig. 3 is a cross sectional view of the joint, taken on or about line III—III of Fig. 2, and looking in the direction of the arrows of said figure.

In the drawing, 1 denotes a comparatively flat driven member having a central opening 2 with opposed arms 3 projecting from the inner face of the driven member 1, at the edges of the opening 2. The ends of the arms 3 are provided with alining openings 4 having the walls thereof screwthreaded, and the confronting faces of said arms are cut away or recessed, as at 5, to provide clearance for the trunnions of a trunnion member to be hereinafter described.

The driven member 1 has the periphery thereof formed with seats 6 and 7, the latter accommodating a cap or coupling member 8 which may be connected to the driven member by suitable fastening means extending through openings 9 in the driven member and said cap.

10 denotes a drive member having a sleeve 11 adapted to receive a shaft. The drive member 10 is cut away, as at 12, to provide opposed arms 13, the ends of said arms are formed similar to the ends of the arms 3, that is, said arms have threaded openings 14 and recessed or cut away portions 15.

16 denotes a trunnion member, somewhat annular in elevation and said trunnion member has the periphery thereof provided with flat facets 17 and sets of trunnions 18 and 19, the trunnions 18 alining with each other and being disposed at right angles to the trunnions 19. The trunnions 18 and 19 slightly taper and with the arms 3 and 13 recessed or cut away it is an extremely easy matter to place the trunnion member between the drive and driven members, whereby the trunnions 19 will extend into the recesses of the arms 13 and the trunnions 18 into the recesses 5 of the arms 3. To hold the trunnions 18 and 19 in engagement with the arms 3 and 13 respectively, exteriorly screwthreaded bushings or sleeves 20 are screwed into the openings 4 and 14, said bushings or sleeves having the outer ends thereof castellated or notched, as at 21, permitting of a spanner wrench or suitable instrument being employed for mounting the bushings in the arms, besides permitting of cotter pins 22 or similar devices being employed for locking the bushings in the arms. The bores of the bushings or sleeves are slightly tapered to conform to the taper of the trunnions 18 and 19, and one face of the trunnion member 16 is formed with opposed lips 23 to engage the inner faces of the arms 13, while the other face of the member 16 is formed with lips 24 to engage the inner faces of the arms 3, all of said lips coöperating with the trunnions 18 and 19 in correctly positioning the member 16 relative to the drive and driven members.

25 and 26 denote inner and outer dust guard members. The inner member 25 is spherically curved and has a tubular portion 27 on the shaft sleeve 11 of the drive member 10. The tubular portion 27 of the inner member 25 terminates in an annular bead or container 28 for packing 29 establishing a non-leakable connection between the shaft sleeve 11 and the member 25. The member 26 has a peripheral flange 30 held by the same fastening means coupling the driven member 1 to the cap 8 and said outer member also has a bead or container 31 for a packing 32, which engages the outer side of the inner member 25 and establishes a non-leakable connection between said members, yet permitting of one member shifting relative to the other, for instance, when the shaft sleeve 11 assumes an angle relative to the longitudinal axis of the cap and driven members.

33 denotes bosses on the drive member 10, said bosses having seats or pockets for coiled compression springs 34, engaging the inner walls of the inner member 25, the expansive force of said springs holding the outer wall of the inner member 25 snugly in engagement with the inner wall of the outer member 26, thus maintaining a non-leakable connection between said members at all times. The members 25 and 26 cooperate with the drive and driven members in forming an inclosure for the articulated portions of the drive and driven members and the container formed by the dust guard may contain a suitable lubricant for the joint. It serves therefore as a shield which prevents any lubricant used in connection with the joint from being thrown therefrom when the joint is in use. This is a desirable feature in connection with motor vehicles as it prevents the accumulation of grease and dust on such parts of the vehicle in proximity to universal joints forming part of the power plant, or power transmission mechanism.

35 denotes a conventional form of stuffing box that may be used upon the end of the shaft sleeve 7 as a further precaution against the waste or loss of lubricant.

It is thought that the utility of the universal joint will be apparent without further description, and while in the drawing there is illustrated a preferred embodiment of my invention, it is to be understood that the structural elements are susceptible to such changes, in size, shape and manner of assemblage as fall within the scope of the appended claims.

What I claim is:—

In a dust guard for universal joints having drive and driven members an inner member adapted to be carried by a drive member, an outer member adapted to be carried by a driven member and engage the outer walls of said inner member, a packing between the walls of said guard members, and springs seated in the drive member engaging the inner walls of said inner member to maintain said inner member in engagement with the outer member.

In testimony whereof I affix my signature in presence of two witnesses.

JOSEPH P. LAVIGNE.

Witnesses:
 ANNA M. DORR,
 CHAS. W. STAUFFIGER.